United States Patent
Yang

(10) Patent No.: US 12,245,089 B2
(45) Date of Patent: Mar. 4, 2025

(54) HANDOVER PROCESSING METHOD AND APPARATUS

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 390 days.

(21) Appl. No.: 17/636,737

(22) PCT Filed: Aug. 22, 2019

(86) PCT No.: PCT/CN2019/102096
§ 371 (c)(1),
(2) Date: Feb. 18, 2022

(87) PCT Pub. No.: WO2021/031216
PCT Pub. Date: Feb. 25, 2021

(65) Prior Publication Data
US 2022/0303841 A1    Sep. 22, 2022

(51) Int. Cl.
H04W 36/00    (2009.01)
H04W 36/08    (2009.01)
H04W 36/36    (2009.01)

(52) U.S. Cl.
CPC ... *H04W 36/0079* (2018.08); *H04W 36/0016* (2013.01); *H04W 36/087* (2023.05); *H04W 36/362* (2023.05)

(58) Field of Classification Search
CPC ......... H04W 36/0079; H04W 36/0016; H04W 36/08; H04W 36/087; H04W 36/362; H04W 36/0061; H04W 76/11
See application file for complete search history.

(56) References Cited

U.S. PATENT DOCUMENTS

| | | | | |
|---|---|---|---|---|
| 2009/0129335 | A1* | 5/2009 | Lee | H04L 1/0026 455/436 |
| 2014/0171085 | A1* | 6/2014 | Li | H04W 36/0061 455/436 |
| 2015/0373602 | A1* | 12/2015 | Hampel | H04W 36/0016 455/437 |

(Continued)

FOREIGN PATENT DOCUMENTS

| | | |
|---|---|---|
| CN | 109600800 A | 4/2019 |
| EP | 2765805 A1 | 8/2014 |

(Continued)

OTHER PUBLICATIONS

European Patent Application No. 19942435.9, extended Search and Opinion dated Mar. 21, 2023, 11 pages.

(Continued)

*Primary Examiner* — Sun Jong Kim
(74) *Attorney, Agent, or Firm* — Cozen O'Connor

(57) ABSTRACT

A handover processing method and apparatus. The method includes: carrying a first cell identifier and at least one second cell identifier in a handover command, in which a first cell identified by the first cell identifier includes a handover target cell, and a second cell identified by the second cell identifier includes a cell that a UE is capable of accessing after the UE fails to be handed over to the first cell; and sending the handover command to the UE.

10 Claims, 8 Drawing Sheets

(56) References Cited

U.S. PATENT DOCUMENTS

| | | | |
|---|---|---|---|
| 2020/0187069 A1* | 6/2020 | Hong | H04W 36/0061 |
| 2022/0022112 A1* | 1/2022 | Lu | H04W 74/0841 |
| 2022/0150780 A1* | 5/2022 | Chen | H04W 36/00837 |

FOREIGN PATENT DOCUMENTS

| | | |
|---|---|---|
| WO | WO 2013013387 A1 | 1/2013 |
| WO | WO 2016150478 A1 | 9/2016 |
| WO | WO 2019001576 A1 | 1/2019 |
| WO | WO 2019137453 A1 | 7/2019 |

OTHER PUBLICATIONS

Chinese Patent Application No. 201980001856.1, Office Action dated Jan. 11, 2021, 7 pages.
Chinese Patent Application No. 201980001856.1, English translation of Office Action dated Jan. 11, 2021, 14 pages.
Apple "Fast Handover Failure Recovery" 3GPP TSG-RAN WG2 Meeting #106, R2-1907176, May 2019, 2 pages.
Media Tek Inc. "Mobility Failure Recovery in NR" 3GPP TSG-RAN WG2 Meeting #106, R2-2906485, May 2019, 6 pages.
PCT/CN2019/102096 International Search Report dated Jun. 2, 2020, 2 pages.
Indian Patent Application No. 202247014680 Office Action dated Oct. 29, 2024, 2 pages.

\* cited by examiner carrying a first cell identifier and at least one second cell identifier in a handover command; a first cell identified by the first cell identifier is: a handover target cell; a second cell identified by the second cell identifier is: a cell the UE is capable of accessing after the UE fails to be handed over to the first cell — S11 sending the handover command to the UE — S12

HANDOVER PROCESSING METHOD AND APPARATUS

CROSS-REFERENCE TO RELATED APPLICATION

This application is a national phase application of International Application No. PCT/CN2019/102096, filed on Aug. 22, 2019, the entire contents of which are hereby incorporated by reference for all purposes.

TECHNICAL FIELD

The present disclosure relates to communication technologies, and particularly to a handover processing method and apparatus.

BACKGROUND

In a 5th generation mobile network or 5th generation wireless system (5G), a conditional handover (CHO) process is proposed, that is, a network may determine a handover target cell in advance, and sends a CHO command to a user equipment (UE), in which a handover target cell and a handover trigger condition are carried. When the handover trigger condition is satisfied, the UE automatically initiates a handover process without sending by the network a handover command.

When the UE has received the CHO command but has not performed handover, the network may send a handover command to the UE, and the UE is handed over to a target cell based on an indication of the handover command without following the CHO command after receiving the handover command. If the UE fails to be handed over based on the handover command, a connection needs to be restored.

SUMMARY

The disclosure provides a handover processing method and apparatus.

According to a first aspect of embodiments of the present disclosure, a handover processing method is provided, and includes: carrying a first cell identifier and at least one second cell identifier in a handover command; in which a first cell identified by the first cell identifier includes a handover target cell; a second cell identified by the second cell identifier includes a cell that a user equipment (UE) is capable of accessing after the UE fails to be handed over to the first cell; and sending the handover command to the UE.

According to a second aspect of embodiments of the present disclosure, a handover processing method is provided. The method is applied to a UE, and includes: receiving a handover command, a first cell identifier and at least one second cell identifier being carried in the handover command; accessing a first cell identified by the first cell identifier based on the handover command; and after failing to access the first cell, accessing a second cell identified by the second cell identifier.

According to a third aspect of embodiments of the present disclosure, a handover processing device is provided, and includes: a processor; a memory configured to store instructions executable by the processor; the processor is configured to perform the any handover processing method applied to a base station side technical solution by performing the instructions.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all the implementations consistent with the present invention. Rather, they are merely examples of the apparatus and method consistent with some aspects of the present invention as detailed in the appended claims.

The terms described in the embodiments of the disclosure are only for the purpose of describing specific embodiments and are not intended to limit the embodiments of the disclosure. The singular forms "a kind of", "a" and "the" used in the disclosure and the attached claim are also intended to include a plural form, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the disclosure to describe various information, the information shall not be limited to these terms. These terms are only used to distinguish the same type of information. For example, subject to the scope of the embodiments of the disclosure, first information may also be referred to as second information, and similarly, second information may also be referred to as first information. It depends on the context. For example, the terms "if" and "in case of" as used herein may be interpreted as "in case that" or "when" or "in response to determining".

Figures 1, 2:
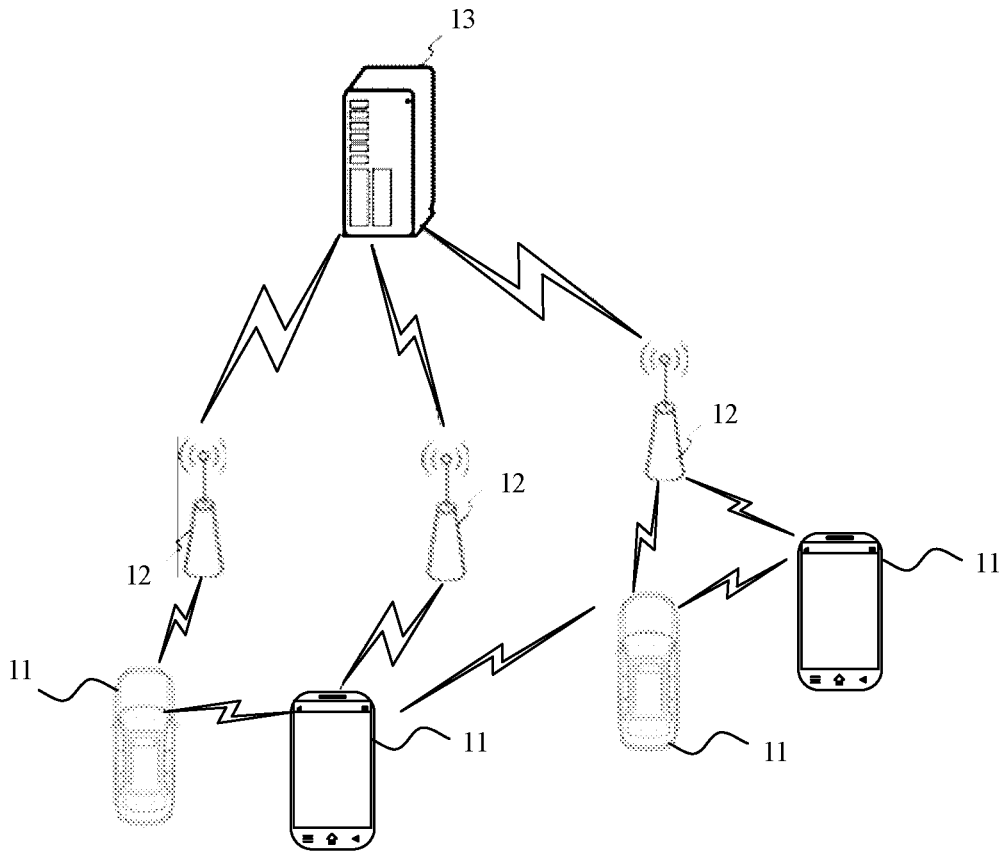
FIG. 1 is a diagram illustrating a wireless communication system according to an exemplary embodiment.
FIG. 2 is a first flowchart illustrating a handover processing method according to an exemplary embodiment.

FIG. 1 is a diagram illustrating a wireless communication system according to an embodiment of the present disclosure. As illustrated in FIG. 1, the wireless communication system is a communication system based on the cellular mobile communication technology. The wireless communication system may include several terminals 11 and several base stations 12.

The terminal 11 may refer to a device that provides voice and/or data connectivity for the user. The terminal 11 may communicate with one or more core networks through a radio access network (RAN). The terminal 11 may be an internet of things terminal, for example, a sensor device, a mobile phone (or referred to as a cellular phone) and a computer having an internet of things terminal, for example, may be a fixed, portable, compact, handheld, computer built-in or vehicle-mounted apparatus. For example, a station (STA), a subscriber unit, a subscriber station, a mobile station, a mobile, a remote station, an access point, a remote terminal, an access terminal, a user terminal, a user agent, a user device or a user equipment (UE). The terminal 11 may be a device of an unmanned vehicle. The terminal 11 may be a vehicle-mounted device, for example, may be a vehicle-mounted computer with a wireless communication function, or may be a wireless communication device externally connected to a vehicle-mounted computer. The terminal 11 may be a roadside device, for example, may be a street lamp, a signal lamp or other roadside device with a wireless communication function, etc.

The base station 12 may be a network side device in the wireless communication system. The wireless communication system may be a 4th generation mobile communication (4G) system, also referred to as a long-term evolution (LTE) system; or the wireless communications system may be a 5G system, also referred to as a new radio (NR) system or a 5G NR system. The wireless communication system may be a next generation system of the 5G system. An access network in the 5G NR system may be referred to as a new generation-radio access network (NG-RAN) or a machine-type communication (MTC) system.

The base station 12 may be an eNB adopted in the 4G system. The base station 12 may be a base station with a centralized distributed architecture (gNB) in the 5G system. When the base station 12 adopts the centralized distributed architecture, it generally includes a central unit (CU) and at least two distributed units (DUs). A protocol stack including a Packet Data Convergence Protocol (PDCP) layer, a Radio Link Control (RLC) layer and a Media Access Control (MAC) layer is configured in the CU; a physical (PHY) layer protocol stack is configured in the DU. The specific implementation of the base station 12 is not limited in embodiments of the disclosure.

The base station 12 may establish a wireless connection with the terminal 11 through a wireless air interface. In different implementations, the wireless air interface is a wireless air interface based on a 4G standard; or, the wireless air interface is a wireless air interface based on a 5G standard, for example, the wireless air interface is a new air interface; or, the wireless air interface may be a wireless air interface based on a next generation mobile communication network technology standard of the 5G.

In some embodiments, an end to end (E2E) connection may be established between the terminals 11. For example, in vehicle to vehicle (V2V) communication, vehicle to infrastructure (V2I) communication, and vehicle to pedestrian (V2P) communication among vehicle to everything (V2X) communication.

In some embodiments, the wireless communication system may further include a network management device 13.

Several base stations 12 may be connected to the network management device 13, respectively. The network management device 13 may be a core network device in the wireless communication system, for example, the network management device 13 may be a mobility management entity (MME) in an evolved packet core (EPC). The network management device may be other core network devices, for example, a serving gate way (SGW), a public data network gate way (PGW), a policy and charging rules function (PCRF) or a home subscriber server (HSS), etc. The implementation of the network management device 13 is not limited in embodiments of the disclosure.

In a 4G handover process, first, a source cell sends a handover request to a handover target cell based on a measurement report result of the UE; then, after the target cell confirms, the source cell sends a handover command carrying configuration information of the target cell to the UE; finally, after the UE receives the handover command, a configuration of the source cell is released, and a random access procedure is initiated to the target cell by using the configuration of the target cell in the handover command.

In order to improve the robustness of handover, a CHO process is proposed in 5G that is, the network may determine a handover target cell in advance, and send a CHO command to the UE, in which the handover target cell and the handover trigger condition are carried. When the handover trigger condition is satisfied, the UE automatically initiates a handover process without sending by the network a handover command.

Since the CHO target cell has stored context of the UE, when the CHO process fails, the UE may be preferentially handed over to another CHO target cell or a connection is reestablished with the other CHO target cell, so as to improve a probability of successful connection recovery. When the UE receives the CHO command but has not performed handover, the network may send a handover command to the UE, and the UE is handed over to a target cell based on an indication of the handover command without following the CHO command after receiving the handover command.

The base station may release the context of the UE of the other CHO target cell before sending the handover command to the UE. In response to the base station sending the handover command to the UE before the UE performs CHO process, the UE may be handed over based on the handover command; in response to failing to be handed over, the UE may preferentially select the CHO target cell for handover or connection reestablishment, in this case, a handover or reestablishment failure may occur.

Based on the above wireless communication system, each method embodiment in the disclosure is proposed with regard to how to reasonably select a cell after failing to be handed over to restore the connection successfully.

FIG. 2 is a first flowchart illustrating a handover processing method according to an embodiment. As illustrated in FIG. 2, the method is applied to a base station, and includes the following.

At block S11, a first cell identifier and at least one second cell identifier are carried in a handover command. A first cell identified by the first cell identifier includes a handover target cell; a second cell identified by the second cell identifier includes a cell that the UE is capable of accessing after the UE fails to be handed over to the first cell.

The second cell is a cell indicated by the CHO command.

The first cell is a target cell the UE needs to access when the UE receives the handover command, and the second cell is a cell that may be accessed by the UE after the UE fails to access the first cell.

As an implementation, duration information is further carried in the handover command, and the duration information is configured to indicate a time range during which the UE is capable of accessing the second cell.

It should be noted that, the time ranges corresponding to different second cells may be the same, and also may be different.

At block S12, the handover command is sent to the UE.

As an implementation, sending the handover command to the UE, includes sending the handover command to the UE before determining that the UE performs handover based on a conditional handover (CHO) command.

In the solution, the method further includes configuring a timer for the second cell based on the duration information; and releasing a resource for the UE to access the second cell when the timer times out.

In this way, resource wastes due to occupying resources for a long time may be reduced.

In the technical solution as described in the embodiments of the disclosure, when the base station to the UE sends a handover command configured to indicate handing over to a first cell and include indication information of a second cell identifier of a second cell that the UE may access in response to the UE failing to be handed over to the first cell, so that the UE may rapidly select an accessible cell to restore a connection after failing to access the first cell, so as to improve a success rate of restoring the connection after falling to be handed over.

Figure 3:
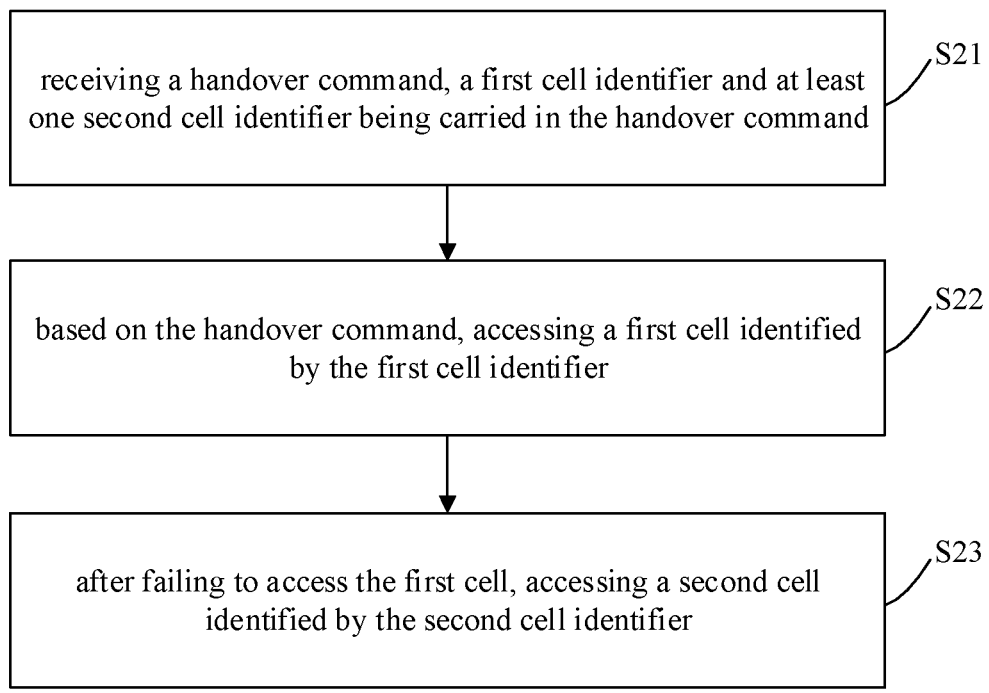
FIG. 3 is a second flowchart illustrating a handover processing method according to an exemplary embodiment.

FIG. 3 is a second flowchart illustrating a handover processing method according to an embodiment. As illustrated in FIG. 3, the method is applied to a UE, and includes the following.

At block S21, a handover command is received, a first cell identifier and at least one second cell identifier are carried in the handover command.

A second cell identified by the second cell identifier is a cell indicated by the CHO command.

At block S22, based on the handover command, a first cell identified by the first cell identifier is accessed.

At block S23, after the first cell fails to be accessed, the second cell identified by the second cell identifier is accessed.

In this way, the UE may restore a communication connection based on the second cell accessible by the UE after failing to access the first cell, so as to improve a success rate of restoring the connection after falling to be handed over.

As an implementation, accessing the second cell identified by the second cell identifier, includes: in response to there being a plurality of the second cells, one of the plurality of the second cells is selected as an access object.

As an implementation, duration information is further carried in the handover command.

As an implementation, after failing to access the first cell, accessing the second cell identified by the second cell identifier, includes: in response to failing to access the first cell and in a time range indicated by the duration information, accessing the second cell identified by the second cell identifier.

In the solution, the method further includes configuring a timer for the second cell based on the duration information; and in response to handing over to the first cell based on the handover command, timing by the timer.

As an implementation, accessing the second cell identified by the second cell identifier, includes: selecting the second cell where the timer does not time out from all second cells for access.

In the technical solution as described in the embodiments of the disclosure, after failing to access the first cell, the UE may rapidly select an accessible cell to restore a connection based on the indication information of the second cell identifier of the second cell that the UE may access in response to the UE failing to be handed over to the first cell which is further carried in the handover command, so as to improve a success rate of restoring the connection after falling to be handed over.

Figure 4:
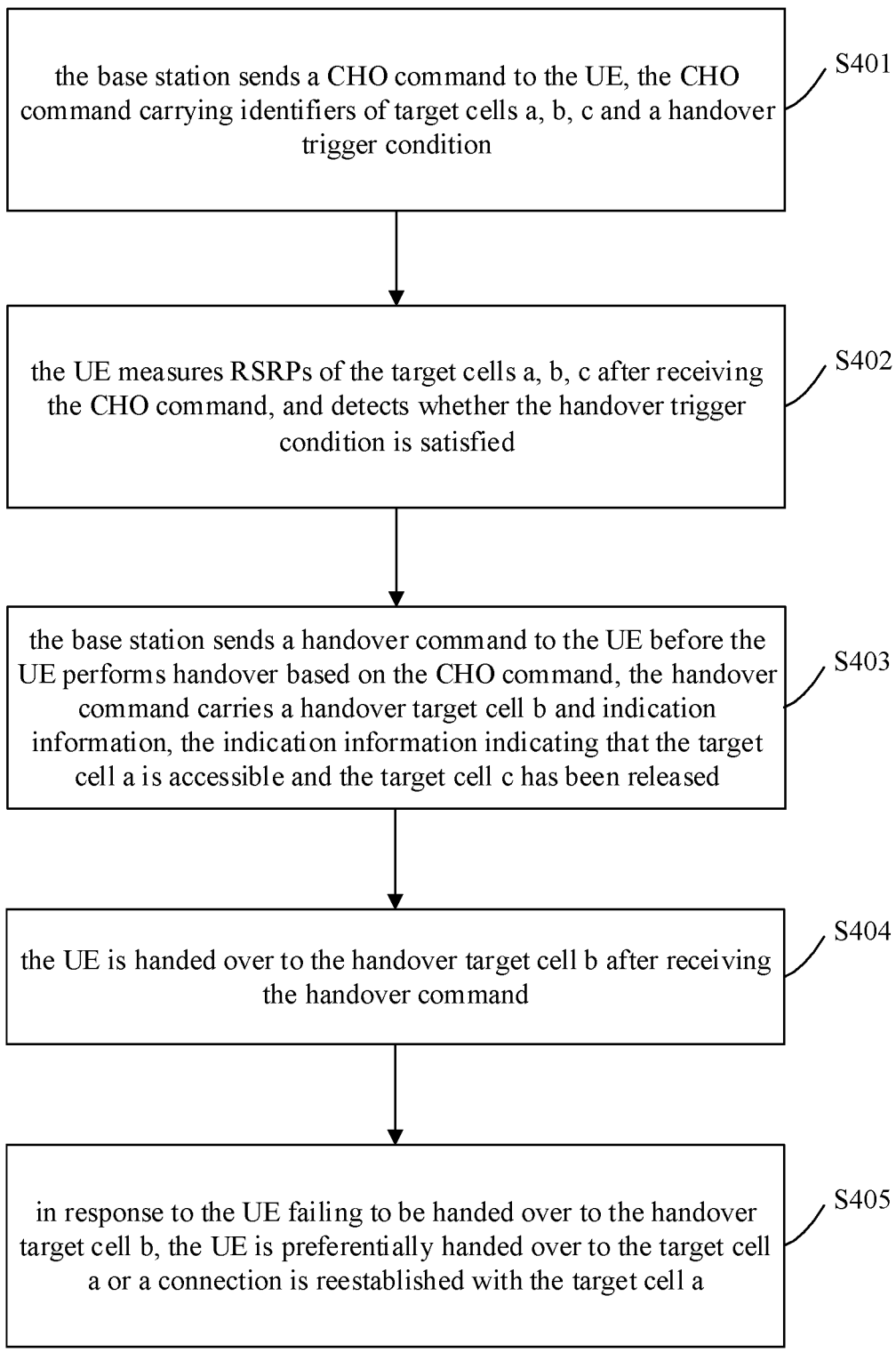
FIG. 4 is a first flowchart illustrating handover processing according to an exemplary embodiment.

FIG. 4 is a first flowchart illustrating handover processing according to an embodiment. The flow may include the following.

At block 401, the base station sends a CHO command to the UE, the CHO command carries identifiers of target cells a, b, c and a handover trigger condition.

The handover trigger condition is that a reference signal receiving power (RSRP) of a cell 1 is 3 db higher than the RSRP of a serving cell.

It should be noted that, the above-mentioned handover trigger condition is only an example, which may be set or adjusted based on actual situations or design requirements.

At block 402, the UE measures RSRPs of the target cells a, b, c after receiving the CHO command, and detects whether the handover trigger condition is satisfied.

It should be noted that, the handover trigger condition in block 401 further may be: a reference signal receiving quality (RSRQ) of the cell 1 is 3 db higher than the RSRQ of the serving cell. The above-mentioned handover trigger condition is only an example, and the numerical value the reference signal receiving quality (RSRQ) of the cell 1 higher than the RSRQ of the serving cell may be set or adjusted based on the actual situations or design requirements. Correspondingly, at block 402, the UE measures RSRQs of the target cells a, b, c after receiving the CHO command, and detects whether the handover trigger condition is satisfied.

At block 403, the base station sends a handover command to the UE before the UE performs handover based on the CHO command, the handover command carries a handover target cell b and indication information, the indication information indicating that the target cell a is accessible and the target cell c has been released.

At block 404, the UE is handed over to the handover target cell b after receiving the handover command.

At block 405, in response to the UE failing to be handed over to the handover target cell b, the UE is preferentially handed over to the target cell a or a connection is reestablished with the target cell a.

In the solution in the embodiment, in response to the UE receiving the handover command before the UE is handed over based on the CHO command, the UE is handed over to the target cell b based on the handover command. In response to the UE failing to be handed over to the target cell b and the target cell a being accessible, the target cell a is selected for handover or connection reestablishment.

Figure 5:
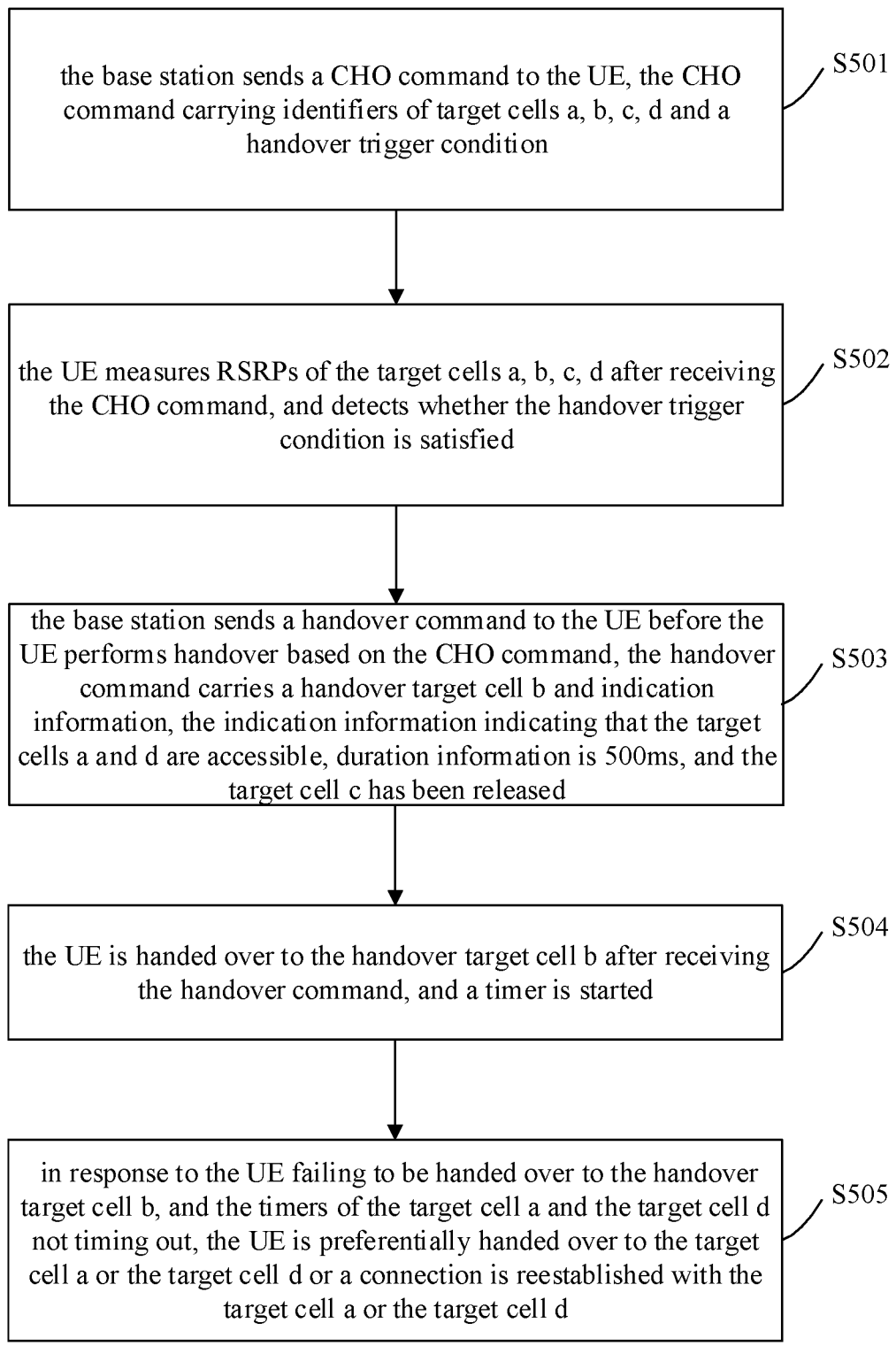
FIG. 5 is a second flowchart illustrating handover processing according to an exemplary embodiment.

FIG. 5 is a second flowchart illustrating handover processing according to an embodiment. The flow may include the following.

At block 501, the base station sends a CHO command to the UE. The CHO command carries identifiers of target cells a, b, c, d and a handover trigger condition.

The handover trigger condition is that a reference signal receiving power (RSRP) of a cell 1 is 5 db higher than the RSRP of a serving cell.

It should be noted that, the above-mentioned handover trigger condition is only an example, which may be set or adjusted based on actual situations or design requirements.

At block 502, the UE measures RSRPs of the target cells a, b, c, d after receiving the CHO command, and detects whether the handover trigger condition is satisfied.

It should be noted that, the handover trigger condition at block 501 further may be: a reference signal receiving quality (RSRQ) of the cell 1 is 5 db higher than the RSRQ of the serving cell. The above-mentioned handover trigger condition is only an example, and the numerical value the RSRQ of the cell 1 higher than the RSRQ of the serving cell may be set or adjusted based on the actual situations or design requirements. Correspondingly, at block 502, the UE measures RSRQs of the target cells a, b, c, d after receiving the CHO command, and detects whether the handover trigger condition is satisfied.

At block 503, the base station sends a handover command to the UE before the UE is handed over based on the CHO command, the handover command carries a handover target cell b and indication information, the indication information indicating that the target cells a and d are accessible, duration information is 500 ms, and the target cell c has been released.

The duration information is configured to indicate a time range during which the UE is capable of accessing the second cell.

At block 504, the UE is handed over to the target cell b after receiving the handover command, and a timer is started.

At block 505, in response to that the UE fails to be handed over to the target cell b and that the timers of the target cell a and the target cell d do not time out, the UE is preferentially handed over to the target cell a or the target cell d, or a connection is reestablished with the target cell a or the target cell d.

In practical applications, the UE may select the target cell a for handover or connection reestablishment; the UE further may select the target cell d for handover or connection reestablishment. It depends on the UE whether to select the target cell a or the target cell d. In the solution of the embodiment, in response to the UE receiving the handover command before the UE is handed over based on the CHO command, the UE is handed over to the target cell b based on the handover command; in response to the UE failing to be handed over to the target cell b, and the timers of the target cell d and the target cell a not timing out, any one of the target cell d and the target cell a is selected for handover or connection reestablishment.

Figure 6:
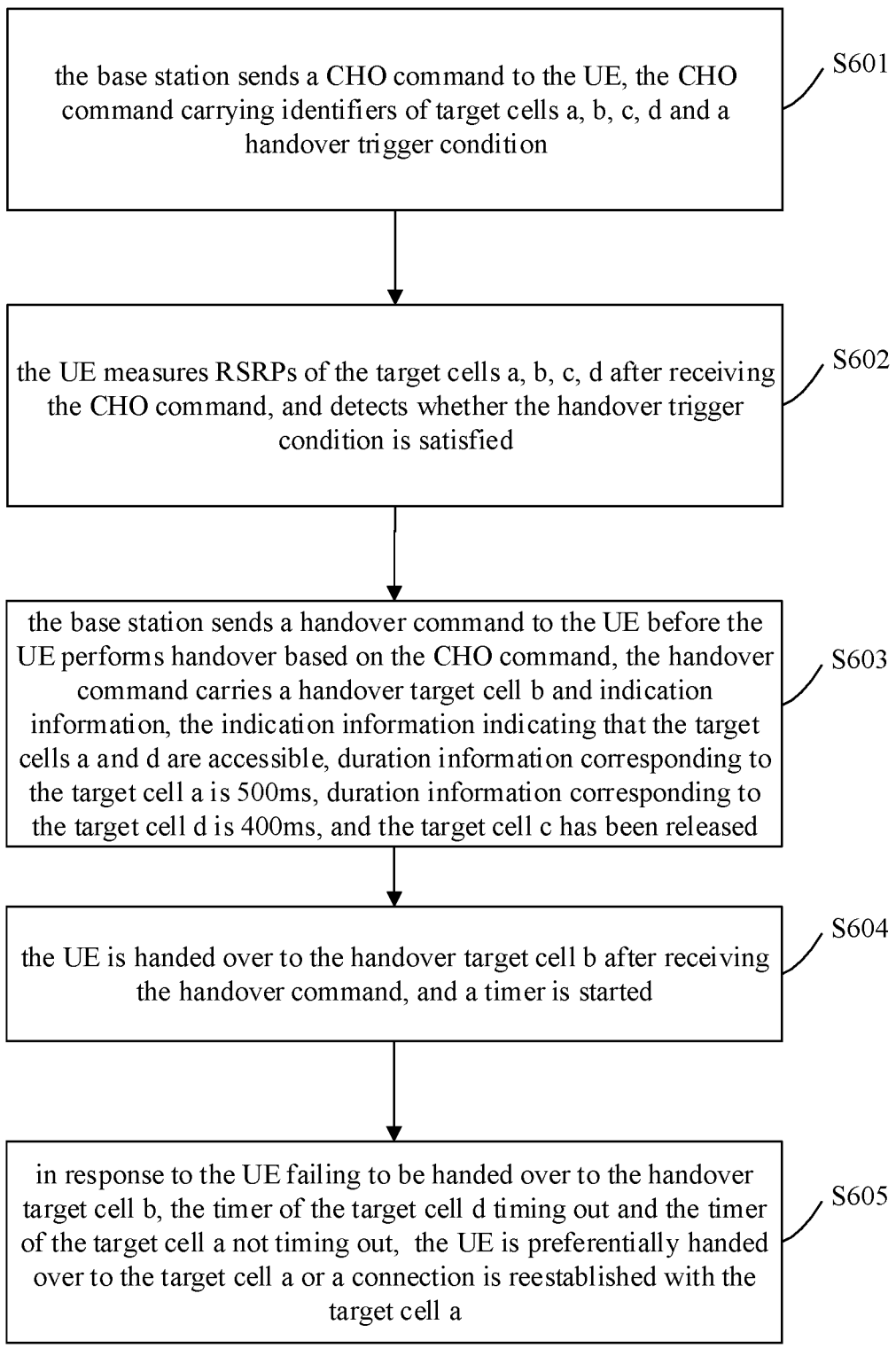
FIG. 6 is a third flowchart illustrating handover processing according to an exemplary embodiment.

FIG. 6 is a third flowchart illustrating handover processing according to an embodiment. The flow includes the following.

At block 601, the base station sends a CHO command to the UE. The CHO command carries identifiers of target cells a, b, c, d and a handover trigger condition.

The handover trigger condition is that a reference signal receiving power (RSRP) of a cell 1 is 2 db higher than the RSRP of a serving cell.

It should be noted that the handover trigger condition is only an example, which may be set or adjusted based on actual situations or design requirements.

At block 602, the UE measures RSRPs of the target cells a, b, c, d after receiving the CHO command, and detects whether the handover trigger condition is satisfied.

It should be noted that, the handover trigger condition at block 601 further may be: a reference signal receiving quality (RSRQ) of the cell 1 is 2 db higher than the RSRQ of the serving cell. The handover trigger condition is only an example, and the numerical value the RSRQ of the cell 1 higher than the RSRQ of the serving cell may be set or adjusted based on the actual situations or design requirements. Correspondingly, at block 602, the UE measures RSRQs of the target cells a, b, c, d after receiving the CHO command, and detects whether the handover trigger condition is satisfied.

At block 603, the base station sends a handover command to the UE before the UE performs handover based on the CHO command, the handover command carries a handover target cell b and indication information, the indication information indicating that the target cells a and d are accessible, duration information corresponding to the target cell a is 500 ms, duration information corresponding to the target cell d is 400 ms, and the target cell c has been released.

The duration information is configured to indicate a time range during which the UE is capable of accessing the second cell.

At block 604, the UE is handed over to the handover target cell b after receiving the handover command, and a timer is started.

At block 605, in response to that the UE fails to be handed over to the target cell b and that the timer of the target cell d times out while the timer of the target cell a does not time out, the UE is preferentially handed over to the target cell a or a connection is reestablished with the target cell a.

In the solution of the embodiment, in response to the UE receiving the handover command before being handed over based on the CHO command, the UE is handed over to the target cell b based on the handover command; in response to the UE failing to be handed over to the target cell b, the timer of the target cell d timing out and the timer of the target cell a not timing out, the target cell a is preferable for handover or connection reestablishment.

Figure 7:
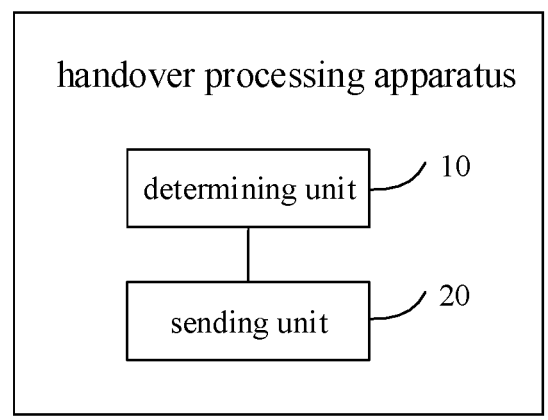
FIG. 7 is a first block diagram illustrating a handover processing apparatus according to an exemplary embodiment.

FIG. 7 is a first block diagram illustrating a handover processing apparatus according to an embodiment. The apparatus is applied to a base station side, as illustrated in FIG. 7, the apparatus includes a determining unit 10 and a sending unit 20.

The determining unit 10 is configured to carry a first cell identifier and at least one second cell identifier in a handover command. A first cell identified by the first cell identifier includes a handover target cell, and a second cell identified by the second cell identifier includes a cell that a user equipment (UE) is capable of accessing after the UE fails to be handed over to the first cell.

The sending unit 20 is configured to send the handover command to the UE.

As an implementation, duration information is further carried in the handover command, the duration information being configured to indicate a time range during which the UE is capable of accessing the second cell.

As an implementation, the determining unit 10, is further configured to: configure a timer for the second cell based on the duration information; and release a resource for the UE to access the second cell when the timer times out.

As an implementation, the sending unit 20, is configured to: send the handover command to the UE before determining that the UE performs handover based on a CHO command.

In the solution, the second cell is a cell indicated by the CHO command.

With regard to the apparatus in the above embodiments, the specific way in which each module performs operation has been described in detail in the method embodiments and will not be elaborated here.

In practical applications, the specific structures of the determining unit 10 and the sending unit 20 may be achieved by the handover processing apparatus or a central processing unit (CPU), a micro controller unit (MCU), a digital signal processing (DSP) or a programmable logic controller (PLC) in the base station to which the handover processing apparatus belongs.

The handover processing apparatus as described in the embodiments may be applied to a base station side.

Those skilled in the art should understand that the function of each processing module in the handover processing apparatus in embodiments of the disclosure may refer to the related description of the handover processing method applied to a base station side, and each processing module in the handover processing apparatus in embodiments of the disclosure may be achieved by an analog circuit configured to achieve the function as described in embodiments of the disclosure, and also may be achieved by a software performing the function as described in embodiments of the disclosure running on the terminal.

In the handover processing apparatus as described in embodiments of the disclosure, when the base station sends the handover command configured to indicate the UE to hand over to the first cell to the UE, indication information of the identifier of the second cell that the UE may access in response to the UE failing to be handed over to the first cell is further carried in the handover command, so that the UE may rapidly select an accessible cell to restore a connection based on the indication information after failing to access the first cell, so as to improve a success rate of restoring the connection after falling to be handed over.

Figure 8:
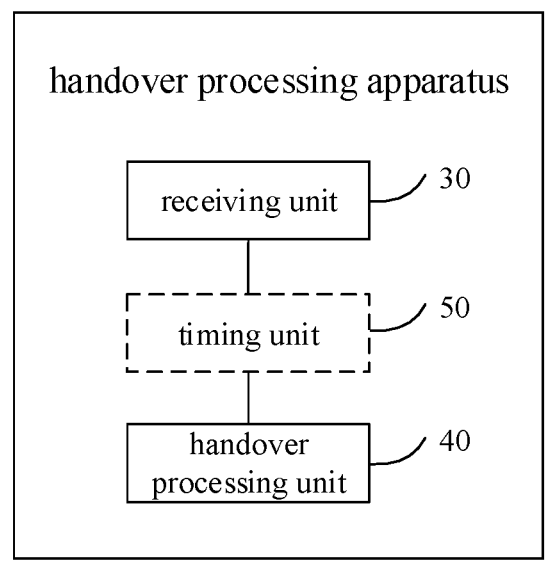
FIG. 8 is a second block diagram two illustrating a handover processing apparatus according to an exemplary embodiment.

FIG. 8 is a second block diagram illustrating a handover processing apparatus according to an embodiment. The apparatus is applied to a UE side; as illustrated in FIG. 8, the apparatus includes a receiving unit 30 and a handover processing unit 40.

The receiving unit 30 is configured to receive a handover command, a first cell identifier and at least one second cell identifier being carried in the handover command.

The handover processing unit 40 is configured to, based on the handover command, access a first cell identified by the first cell identifier.

The handover processing unit 40 is further configured to, after failing to access the first cell, access a second cell identified by the second cell identifier.

As an implementation, duration information is further carried in the handover command; the handover processing unit 40, is configured to: in response to failing to access the first cell and in a time range indicated by the duration information, access the second cell identified by the second cell identifier.

In the solution, the apparatus may further include a timing unit 50.

The timing unit 50 is configured to: configure a timer for the second cell based on the duration information; and in response to handing over to the first cell based on the handover command, time the time range by the timer.

As an implementation, the handover processing unit 40, is further configured to: select the second cell where the timer does not time out from all the second cells for access.

As an implementation, the receiving unit 30 is further configured to receive a CHO command; the handover processing unit 40 is configured to, before the UE performs handover based on the CHO command, hand over to the first cell based on the handover command.

In the solution, the second cell is a cell indicated by the CHO command.

With regard to the device in the above embodiments, the specific way in which each module performs the operation has been described in detail in the method embodiments and will not be elaborated here.

In practical applications, the specific structures of the above receiving unit 30, the handover processing unit 40 and the timing unit 50 may be achieved by the handover processing apparatus or a CPU, an MCU, a DSP or a PLC in a terminal the handover processing apparatus belongs to.

The handover processing apparatus as described in the embodiments may be applied to a UE side.

Those skilled in the art should understand that the function of each processing module in the handover processing apparatus in embodiments of the disclosure may refer to the related description of the handover processing method applied to a UE side, and each processing module in the handover processing apparatus in embodiments of the disclosure may be achieved by an analog circuit configured to achieve the function as described in embodiments of the disclosure, and also may be achieved by a software performing the function as described in embodiments of the disclosure running on the terminal.

According to the handover processing apparatus in embodiments of the disclosure, after failing to access the first cell, the UE may rapidly select an accessible cell to restore a connection based on the indication information of the identifier of the second cell that the UE may access in response to the UE failing to be handed over to the first cell further carried in the handover command, so as to improve a success rate of restoring the connection after falling to be handed over.

Figure 9:
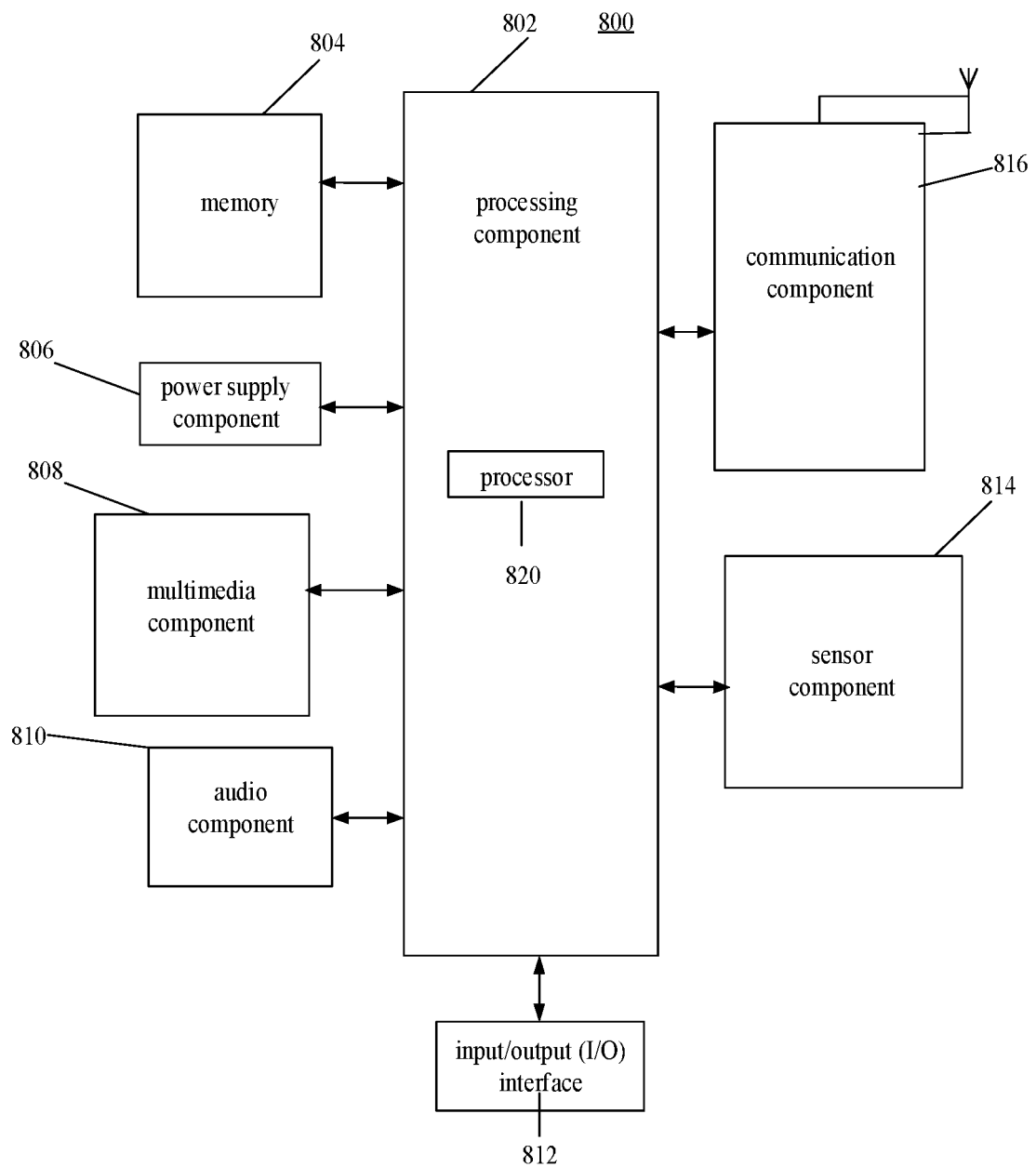
FIG. 9 is a first block diagram illustrating a device 800 configured to achieve handover processing according to an exemplary embodiment.

FIG. 9 is a block diagram illustrating a device 800 configured to achieve handover processing according to an embodiment. For example, the device 800 may be a mobile phone, a computer, a digital broadcasting terminal, a messaging device, a game console, a tablet device, a medical equipment, a fitness equipment, a personal digital assistant, etc.

As illustrated in FIG. 9, the device 800 may include one or more components: a processing component 802, a memory 804, a power supply component 806, a multimedia component 808, an audio component 810, an input/output (//O) interface 812, a sensor component 814, and a communication component 816.

The processing component 802 generally controls the whole operation of the device 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the device 800. Examples of the data include the instructions of any applications or methods operated on the device 800, contact data, phone book data, messages, pictures, videos, etc. The memory 804 may be achieved by any type of temporary or non-temporary storage devices or their combination, such as a static random access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic disk or an optical disk.

The power supply component 806 may provide power supply for all components of the device 800. The power supply component 806 may include power supply management system, one or more power supplies, and other units related to generating, managing and distributing power for the device 800.

The multimedia component 808 includes an output interface screen provided between the device 800 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 includes a front camera and/or a rear camera. When the device 800 is in operation mode, such as shooting mode or video mode, the front camera or the rear camera may receive the external multimedia data. Each front camera and rear camera may be a fixed optical lens system or an optical lens system with focal length and optical zoom capacity.

The audio component 810 is configured as an output and/or input signal. For example, the audio component 810 includes a microphone (MIC). When the device 800 is in operation modes, such as a call mode, a record mode, and a voice recognition mode, the microphone is configured to receive an external audio signal. The audio signal received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the device 800. For example, the sensor component 814 may detect the on/off state of the device 800 and the relative positioning of the component. For example, the component is a display and a keypad of the device 800. The sensor component 814 may further detect the location change of the device 800 or one component of the device 800, the presence or absence of contact between the user and the device 800, the orientation or acceleration/deceleration of the device 800, and the temperature change of the device 800. The sensor component 814 may include a proximity sensor configured to detect the existence of the objects nearby without any physical contact. The sensor component 814 further may include a light sensor such as a complementary metal oxide semiconductor (CMOS) or a charge-coupled device (CCD) image sensor, which is configured to use in imaging applications. In some embodiments, the sensor component 814 further may include an acceleration transducer, a gyroscope sensor, a magnetic sensor, a pressure sensor or a temperature sensor.

The communication component 816 is configured for the convenience of wire or wireless communication between the device 800 and other devices. The device 800 may access wireless networks based on communication standard, such as WiFi, 2G or 3G; or their combination. In an exemplary embodiment, the communication component 816 receives a broadcast signal or broadcast-related information from an external broadcast management system via a broadcast channel. In an exemplary embodiment, the communication component 816 further includes a near field communication (NFC) module to facilitate short-range communication. For example, an NFC module may be achieved based on a radio frequency identification (RFID) technology, an infrared data association (IRDA) technology, an ultra wide band (UWB) technology, a bluetooth (BT) technology and other technologies.

In an exemplary embodiment, the device 800 may be achieved by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, which is configured to perform the above handover switching method.

In an embodiment, a non-transitory computer storage medium including executable instructions is further provided, such as a memory 804 including instructions, the executable instructions may be performed by the processor 820 of the device 800 to complete the above method. For example, the non-transitory computer storage medium may be a ROM, a random access memory (RAM), a CD-ROM, a magnetic tape, a floppy disk, an optical data storage device, etc.

Figure 10:
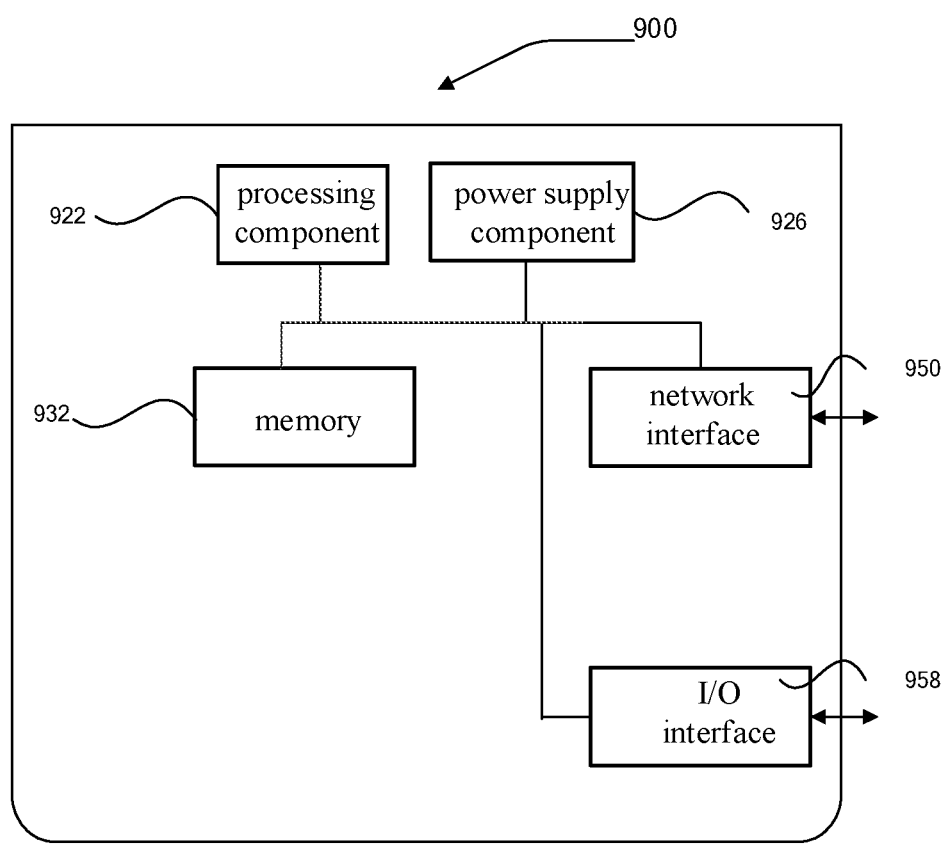
FIG. 10 is a second block diagram illustrating a device 900 configured to achieve handover processing according to an exemplary embodiment.

FIG. 10 is a block diagram illustrating a device 900 configured to achieve handover processing according to an embodiment. For example, the device 900 may be provided as a server. Referring to FIG. 10, the device 900 includes a processing component 922, which further include one or more processors, and memory resources represented by a memory 932, which are configured to store instructions executed by the processing component 922, for example, an application. The application stored in the memory 932 may include one or more modules each of which corresponds to a set of instructions. In addition, the processing component 922 is configured to perform instructions, to perform the above handover processing method.

The device 900 may further include a power supply component 926 configured to execute power management of the device 900, and a wired or wireless network interface 950 configured to connect the device 900 to a network, and an input/output (I/O) interface 958. The device 900 may operate an operating system stored in the memory 932, for example, Windows Server™, Mac OS X™, Unix™, Linux™, FreeBSD™ or the like.

The technical solutions recorded in embodiments of the disclosure may be arbitrarily combined if there is no conflict.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present invention is not limited to the precise structure described above and shown in the drawings, and various modifications and changes may be made without departing from its scope. The scope of the present application is only limited by the appended claims.

INDUSTRIAL APPLICABILITY

In the technical solution in embodiments of the disclosure, a first cell identifier and at least one second cell identifier are carried in a handover command, a first cell identified by the first cell identifier is a handover target cell, and a second cell identified by the second cell identifier is a cell the UE is capable of accessing after the UE fails to be handed over to the first cell. The handover command is sent to the UE, so that the UE may rapidly select an accessible cell to restore a connection after failing to be handed over, so as to improve a success rate of restoring the connection after falling to be handed over.

What is claimed is:

1. A handover processing method, comprising:
sending a conditional handover (CHO) command indicating a first cell identifier and a plurality of second cell identifiers; and
sending a handover command to a user equipment (UE) before determining that the UE performs handover based on the CHO command;
wherein the handover command indicates a first cell identified by the first cell identifier and duration information comprising a plurality of time ranges, each of which corresponds to each of the plurality of second cell identifiers; wherein the first cell identified by the first cell identifier comprises a first handover target cell, and a plurality of second cells respectively identified by the plurality of second cell identifiers comprises a second handover target cell to which the UE is capable of accessing after the UE fails to be handed over to the first handover target cell indicated in the handover command,
wherein the duration information is configured to indicate a second time range of the plurality of time ranges corresponding to the second handover target cell, and
wherein in response to the UE fails to be handover to the first handover target cell, the second time range of the duration information is used for the UE to select the second handover target cell identified by a corresponding second cell identifier from the plurality of second cell identifier indicated by the CHO command and to be handed over to the second handover target cell.

2. The method of claim 1, wherein, the method further comprises:
configuring a corresponding timer for each of the plurality of second cells based on the duration information; and
releasing a resource for the UE to access each of the plurality of second cells when the timer times out.

3. A handover processing method, comprising:
receiving a conditional handover (CHO) command indicating a first cell identifier and a plurality of second cell identifiers;
receiving a handover command before a user equipment (UE) performing handover based on the CHO command, wherein the handover command indicates a first cell identified by the first cell identifier and duration information comprising a plurality of time ranges, each of which corresponds to each of the plurality of second cell identifiers, wherein a plurality of second cells respectively identified by the plurality of second cell identifiers comprises a second handover target cell to which the UE is capable of accessing after the UE fails to be handed over to the first cell indicated in the handover command, wherein the duration information is configured to indicate a second time range of the plurality of time ranges corresponding to the second handover target cell; and
accessing the first cell identified by the first cell identifier based on the handover command; and
after failing to access the first cell, selecting the second handover target cell identified by a corresponding second cell identifier from the plurality of second cell identifiers indicated by the CHO command based on the duration information;
accessing the second handover target cell.

4. The method of claim 3, wherein, the method further comprises:
configuring a corresponding timer for each of the plurality of second cells based on the duration information; and
in response to performing handover to the first cell based on the handover command, starting the corresponding timer for timing within each of the plurality of time ranges.

5. The method of claim 4, wherein, accessing the second handover target cell, comprises:
selecting the second handover target cell whose timer does not time out from the plurality of second cells for access.

6. A handover processing device, comprising:
a processor; and
a memory configured to store instructions executable by the processor,
wherein, the processor is configured to: perform the method of claim 1 when executing the instructions.

7. A handover processing device, comprising:
a processor; and
a memory configured to store instructions executable by the processor,
wherein, the processor is configured to, when executing the instructions, perform a handover processing method, comprising:
receiving a conditional handover (CHO) command indicating a first cell identifier and a plurality of second cell identifiers;
receiving a handover command before a user equipment (UE) performing handover based on the CHO command, wherein the handover command indicates a first cell identified by the first cell identifier and duration information comprising a plurality of time ranges, each of which corresponds to each of the plurality of second cell identifiers, wherein a plurality of second cells respectively identified by the plurality of second cell identifiers comprises a second handover target cell to which the UE is capable of accessing after the UE fails to be handed over to the first cell indicated in the handover command, wherein the duration information is configured to indicate a second time range of the plurality of time ranges corresponding to the second handover target cell; and
accessing the first cell identified by the first cell identifier based on the handover command; and
after failing to access the first cell, selecting the second handover target cell identified by a corresponding second cell identifier from the plurality of second cell identifiers indicated by the CHO command based on the duration information;
accessing the second handover target cell.

8. The device of claim 7, wherein, the processor is further configured to perform:
- configuring a corresponding timer for each of the plurality of second cells based on the duration information; and
- in response to performing handover to the first cell based on the handover command, starting the corresponding timer for timing within each of the plurality of time ranges.

9. The device of claim 8, wherein, accessing the second handover target cell, comprises:
- selecting the second handover target cell whose timer does not time out from the plurality of second cells for access.

10. The device of claim 6, wherein, the processor is further configured to perform:
- configuring a corresponding timer for each of the plurality of second cells based on the duration information; and
- releasing a resource for the UE to access each of the plurality of second cells when the timer times out.

* * * * *